(12) United States Patent
Bachmann et al.

(10) Patent No.: US 10,773,673 B2
(45) Date of Patent: Sep. 15, 2020

(54) CABLE CONDUIT DEVICE FOR CONNECTION CABLES OF AN AIRBAG MODULE, WIRING SYSTEM, AIRBAG MODULE, AND STEERING WHEEL OR VEHICLE COMPRISING A CABLE CONDUIT DEVICE OF SAID TYPE

(71) Applicant: TRW AUTOMOTIVE SAFETY SYSTEMS GMBH, Aschaffenburg (DE)

(72) Inventors: Stefan Bachmann, Heimbuchenthal (DE); Matthias Helmstetter, Aschaffenburg (DE); Dieter Rumpf, Rödermark (DE); Alexandra Knecht, Haibach (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 151 days.

(21) Appl. No.: 15/770,570

(22) PCT Filed: Nov. 30, 2016

(86) PCT No.: PCT/EP2016/079269
§ 371 (c)(1),
(2) Date: Apr. 24, 2018

(87) PCT Pub. No.: WO2017/093313
PCT Pub. Date: Jun. 8, 2017

(65) Prior Publication Data
US 2018/0297544 A1 Oct. 18, 2018

(30) Foreign Application Priority Data
Dec. 2, 2015 (DE) .......................... 10 2015 015 450

(51) Int. Cl.
*B60R 21/017* (2006.01)
*B60R 16/02* (2006.01)
(Continued)

(52) U.S. Cl.
CPC .......... *B60R 21/017* (2013.01); *B60R 16/027* (2013.01); *B60R 16/0215* (2013.01); *B60R 21/203* (2013.01); *B60R 2021/01006* (2013.01)

(58) Field of Classification Search
CPC .............. B60R 16/0215; B60R 16/017; B60R 2021/01006
See application file for complete search history.

(56) References Cited

U.S. PATENT DOCUMENTS 4,973,859 A * 11/1990 Shodai ................ B60R 21/0176
280/735
5,429,517 A 7/1995 Bolea
(Continued)

FOREIGN PATENT DOCUMENTS

DE 4431719 3/1996
DE 19727856 1/1999
(Continued)

*Primary Examiner* — James A English
(74) *Attorney, Agent, or Firm* — Tarolli, Sundheim, Covell & Tummino LLP (57) ABSTRACT

The invention relates to a cable conduit device for connection cables of an airbag module, comprising at least one cable duct (10) that includes retaining means (11) for at least one cable (30), and at least one contact plug (20) to be connected to a coil spring on a steering column; the contact plug (20) is or can be coupled in a twist-proof manner to the cable duct (10).

18 Claims, 7 Drawing Sheets

(51) Int. Cl.
*B60R 16/027* (2006.01)
*B60R 21/203* (2006.01)
*B60R 21/01* (2006.01)

(56) References Cited

U.S. PATENT DOCUMENTS

| | | | | |
|---|---|---|---|---|
| 5,460,535 | A | * | 10/1995 | Bolen .................. B60R 16/027 439/15 |
| 6,037,987 | A | * | 3/2000 | Sethuraman ......... H04N 19/176 375/240.03 |
| 6,086,093 | A | | 7/2000 | Whelan |
| 6,131,946 | A | * | 10/2000 | Castleman ........... B60Q 1/0082 280/728.2 |
| 6,392,147 | B1 | * | 5/2002 | Hier .................... B60R 16/0215 174/135 |
| 6,641,195 | B2 | * | 11/2003 | Shikata .............. B60H 1/00535 296/70 |
| 7,265,998 | B2 | * | 9/2007 | Suzuki ................ B60R 16/0215 174/51 |
| 2004/0053517 | A1 | * | 3/2004 | DuRocher .......... H01R 13/6315 439/15 |
| 2004/0124706 | A1 | | 7/2004 | Suzuki et al. |
| 2005/0035575 | A1 | | 2/2005 | Lim |
| 2005/0106913 | A1 | | 5/2005 | Khoury et al. |
| 2005/0116120 | A1 | | 6/2005 | Maruyama |
| 2005/0124179 | A1 | | 6/2005 | Terada |
| 2005/0269194 | A1 | | 12/2005 | Holzel et al. |
| 2006/0191704 | A1 | * | 8/2006 | Riester ................ B60R 16/0215 174/72 A |
| 2014/0144344 | A1 | * | 5/2014 | Brisighella, Jr. ........ C06D 5/00 102/530 |
| 2017/0066398 | A1 | | 3/2017 | Bachmann et al. |

FOREIGN PATENT DOCUMENTS

| | | |
|---|---|---|
| DE | 19914653 | 7/2000 |
| DE | 10214609 | 10/2003 |
| DE | 102014000966 | 7/2015 |

* cited by examiner

CABLE CONDUIT DEVICE FOR CONNECTION CABLES OF AN AIRBAG MODULE, WIRING SYSTEM, AIRBAG MODULE, AND STEERING WHEEL OR VEHICLE COMPRISING A CABLE CONDUIT DEVICE OF SAID TYPE

RELATED APPLICATIONS

This application corresponds to PCT/EP2016/079269, filed Nov. 30, 2016, which claims the benefit of German Application No. 10 2015 015 450.8, filed Dec. 2, 2015, the subject matter of which are incorporated herein by reference in their entirety.

BACKGROUND OF THE INVENTION

The invention relates to a cable conduit device for connection cables of an airbag module. The invention further relates to a wiring system of an airbag module by said cable conduit device as well as to an airbag module, a steering wheel and a vehicle each comprising a cable conduit device of said type.

Steering wheel component groups comprising a steering wheel and an airbag module usually are manufactured by external suppliers and are connected to the vehicle as fate as during final assembly of an entire vehicle at the vehicle manufacturer. For this purpose, the steering wheel component group is attached and fixed to a steering column. At the same time, it is necessary to couple at least the airbag module, especially the gas generator disposed therein, to the electrical system of the vehicle. For this, the vehicle usually includes at the steering column a coil spring having an appropriate contact connector. In the steering wheel, especially at the airbag module, there are provided cables ending in a plug which prior to assembly of the steering wheal has to be connected to the coil spring.

In practice, the contact plug is manually connected to the coil spring with a correct orientation of the plug having to be observed. The manual connection entails the risk of the cable loom arranged downstream of the plug being twisted, even if said cable loom is guided along the airbag module inside a cable duct. This is unwanted, as for example a signal transmission inside the cable harness of the vehicle may be disturbed by inductive effects.

SUMMARY OF THE INVENTION

Consequently, it is the object of the invention to provide an improved cable conduit device for connection cables of an airbag module that enables the airbag module or a steering wheel to be correctly and easily mounted on the vehicle. Furthermore, it is the object of the invention to provide a wiring system of an airbag module, an airbag module and a steering wheel or vehicle comprising a cable conduit device of said type.

In accordance with the invention, this object is achieved with respect to the cable conduit device by the subject matter of claim 1, with respect to the wiring system by the subject matter of claim 10, with respect to the airbag module by the subject matter of claim 14 and with respect to the steering wheel or the vehicle by the subject matter of claim 16.

The invention is based on the idea to state a cable conduit device for connection cables of an airbag module comprising at least one cable duct that includes retaining means for at least one cable. The cable conduit device further includes at least one contact plug for connection to a coil spring of a steering column. The contact plug is or can be coupled in a twist-proof manner to the cable duct.

According to a preferred configuration of the invention, the cable duct (and, resp., the connecting portion thereof) will be/is connected to the contact plug by means of an intermediate element, especially a double-faced adhesive tape, adapted to be permanently adhesively coupled to each of the cable duct and the contact plug.

The twist-proof coupling of the contact plug to the cable duct helps to achieve that the contact plug is correctly orientated so that during vehicle assembly it can be easily connected to the coil spring. The steering wheel assembly can thus be performed in a safe and efficient manner. At the same time, unwanted twisting of the cables or, resp., connection cables extending through the cable duct is avoided.

In general, consequently in the invention a cable duct including a connecting portion is provided, with said connecting portion being formed in a twist-proof seat of a contact plug. The connecting portion may be formed integrally with the cable duct and, resp., with a conduit portion of the cable duct. Within the scope of the present application, thus both the cable conduit device comprising the cable duct and the contact plug and the cable duct per se are disclosed and claimed, wherein the cable duct includes a connecting portion for twist-proof fixation of a contact plug at the cable duct.

In this respect, as regards the cable conduit device in a preferred variant the cable duct is provided to include a conduit portion and a connecting portion. The contact plug may be coupled or adapted to be coupled to the connecting portion. The contact plug may be coupled or adapted to be coupled especially by a locking connection or clamping connection to the connecting portion.

The conduit portion mainly serves for correctly guiding the cable along the airbag module and, resp., inside the steering wheel component group. This prevents the cables from constituting an obstruction during assembly of the airbag module. For this, the conduit portion may have a substantially U-shaped cross-sectional profile so that a direction of extension for the cables is predetermined. The retaining means for retaining the cables inside the cable duct are preferably configured in the conduit portion. The connecting portion, on the other hand, serves for coupling the contact plug to the cable duct. For this purpose, e.g. a locking connection or clamping connection may be provided, which facilitates the assembly of the cable conduit device.

Concretely speaking, the cable duct, especially the connecting portion, may include snap hooks or clip connectors for the connection to the contact plug. Corresponding detent recesses into which the snap hooks or clip connectors will engage may be provided on the contact plug so as to fix the contact plug to the cable duct. The snap hooks or clip connectors may be formed integrally with the cable duct and, resp., the connecting portion.

Especially, the connecting portion may include a bottom plate on which the snap hooks or clip connectors are disposed. The snap hooks or clip connectors are preferably positioned on the bottom plate so that they laterally encompass the contact plug in a coupled state. In total, the bottom plate may have a width larger than the width of the contact plug, wherein the snap hooks or clip connectors are arranged at the edges of the bottom plate. The clip connectors encompass the contact plug so as to fix the same in a twist-proof manner to the bottom plate. This constitutes a simple option of establishing a connection between the cable duct and an existing contact plug. Previously known contact plugs can be connected to the cable duct in this way without having to modify the constructional design of the contact plug itself.

In another embodiment of the cable conduit device according to the invention, the cable duct, especially the connecting portion may be provided so as to extend through the contact plug. Accordingly, the contact plug is coupled to the cable duct by the form-fit accommodation of the connecting portion within the contact plug. In this way, the arrangement of snap connectors or clip connectors at the cable duct can be avoided.

The contact plug may include a plug cover and a plug body. The cable duct, especially the connecting portion, can be advantageously adapted to be disposed or disposed, especially by clamping, between the plug cover and the plug body. The coupling or fastening of the contact plug to the cable duct is thus realized by a two-part design of the contact plug. Between the plug cover and the plug body a clearance is provided through which the cable duct and, resp., the connecting portion thereof can extend.

In addition, the plug cover may be adapted so that the plug cover together with the plug body exerts a clamping force on the connecting portion. For example, at the plug cover clamp spring elements may be provided for exerting a clamping force on the cable duct. Generally, the two-part arrangement of the contact plug comprising a plug cover and a plug body helps to advantageously achieve the cables to be easily introduced to the contact plug. Preferably the contact plug is closed by the plug cover only when the connecting portion of the cable duel has been arranged between the plug body and the plug cover before. Thus, when the contact plug is closed, at the same time the coupling to the cable duct can be established.

It is also advantageous when the cable duct, especially the connecting portion, includes a bottom plate having a width smaller than the width of the contact plug, especially of the plug cover and/or the plug body. This facilitates passing the cable duct through the contact plug.

It may be generally provided that the contact plug and/or the connecting portion is/are arranged at a longitudinal end or between longitudinal ends of the cable duct. In other words, the connecting portion of the cable duct may be arranged at a longitudinal end of the cable duct so that one single conduit portion extends from the connecting portion. As an alternative, the connecting portion may be arranged between two conduit portions. A first conduit portion can be used especially for guiding connection cables of an airbag module and a second conduit portion may be used for guiding connection cables of a steering wheel.

In any case, in a preferred variant of the invention the cable duct is provided to be integrally formed, in particular, the cable duct may be a plastic injection-molded part. In this way, the cable duct can be easily manufactured at low cost.

An independent aspect of the invention relates to a wiring system of an airbag module by an afore-described cable conduit device. The wiring system further comprises one or more electrically conducting cables that are disposed in the cable conduit device and are especially positively fixed by the retaining means in the cable conduit device. The retaining means preferably fix the cables in the conduit portion of the cable duct of the cable conduit device. The retaining means may be in the form of projections extending from sidewalls of the cable duct. Especially, the retaining means may extend in parallel to a duct bottom of the cable duct and thus prevent the cables from slipping out of the cable duct.

The cables arranged in the cable conduit device may be module connection cables. Within the scope of the application, cables or connection cables that extend between the airbag module and the contact plug and, resp., electrically connect the airbag module to the coil spring are referred to as module connection cables. The module connection cables especially comprise at least one release cable for at least one pyrotechnical actuator. The pyrotechnical actuator may be a gas generator for an airbag of the airbag module. Further, a pyrotechnical actuator may be provided for use in severing a tether of the airbag. Alternatively or additionally, the module connection cables may include at least one horn contact cable.

The cables arranged in the cable conduit device also can be steering wheel connection cables. Within the scope of the present application, steering wheel connection cables are understood to be cables extending between the steering wheel and the contact plug and, resp., electrically connecting the contact plug to the steering wheel. The steering wheel connection cables may comprise especially at least one multi-function switch cable and/or at least one lighting cable. Frequently, steering wheels include multi-function keys for actuating various vehicle functions. They are connected to the vehicle electrics or vehicle electronics by means of the multi-function switch cables. Especially the multi-function keys in many cases are backlit so that in the steering wheel moreover a lighting means is provided that is connectable to the contact plug by the lighting cables.

In a preferred variant of the wiring system according to the invention, the steering wheel connection cables end in the contact plug. As an alternative, the steering wheel connection cables may end in a separate steering wheel connection plug. When a separate steering wheel connection plug or any other plug is provided, the cable duct of the cable conduit device may include two connecting portions, wherein a first connecting portion can be coupled in a rotationally fixed manner to the contact plug for connection to the winding shaft and a second connecting portion can fix the steering wheel connection plug or the further plug. This results in facilitated assembly of the entire vehicle, as merely the contact plug has to be connected to the cable harness of the vehicle so as to couple all functions of the steering wheel component group (steering wheel and airbag module) to the vehicle electrics and electronics, respectively.

Between the first connecting portion and the second connecting portion a conduit portion of the cable duct can extend. Concretely speaking, the steering wheel connection plug or the further plug may be connected to the contact plug by a conduit portion of the cable duct. In this way, an ordered cable conduit is realized between the steering wheel connection plug or the further plug and the contact plug.

Another independent aspect of the invention relates to an airbag module comprising an afore-described cable-conduit device and/or the afore-described wiring system. In a preferred variant, the cable conduit device may be provided to bundle all connection cables of the airbag module and of the steering wheel. This prevents any connection cables from being provided loosely at the airbag module and especially at the entire steering wheel component group, and from possibly impeding the assembly on the vehicle. It is also possible, however, that the cable conduit device bundles only a first part of the connection cables of the airbag module and of the steering wheel, with a second part of the connection cables being loosely arranged or being bundled in a separate cable conduit. In other words, in a variant only one single cable conduit device may be provided on the airbag module. The single cable conduit device is preferably designed in one part. Alternatively, the cable conduit device may constitute an extra element which is arranged in addition to a separate cable conduit on the airbag module.

Within the scope of the present application, moreover a steering wheel or a vehicle comprising an afore-described cable conduit device and/or an afore-described wiring system and/or an afore-described airbag module is disclosed and claimed.

BRIEF DESCRIPTION OF THE DRAWING

Hereinafter, the invention will be illustrated in detail by way of embodiments with reference to the enclosed schematic drawings, wherein.

DESCRIPTION

Figure 1:
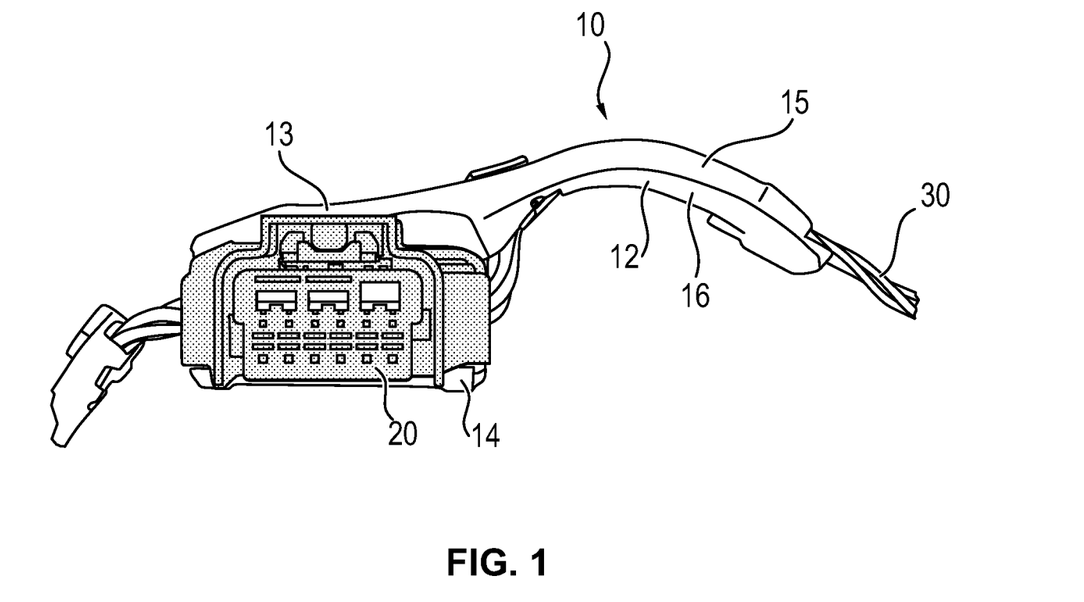
FIG. 1 shows a front view onto a cable conduit device according to the invention in accordance with a preferred embodiment, the cable duct including one single conduit portion.
Figure 2:
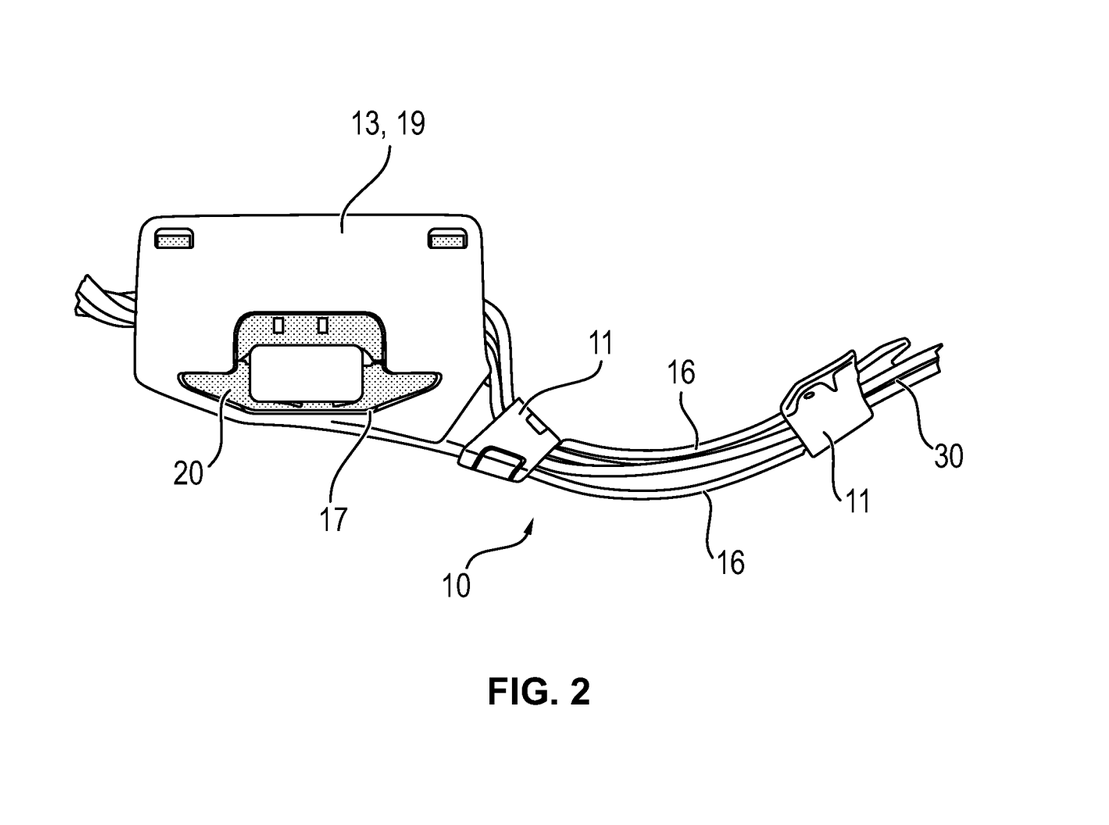
FIG. 2 shows a rear view of the cable conduit device according to FIG. 1.
Figure 3:
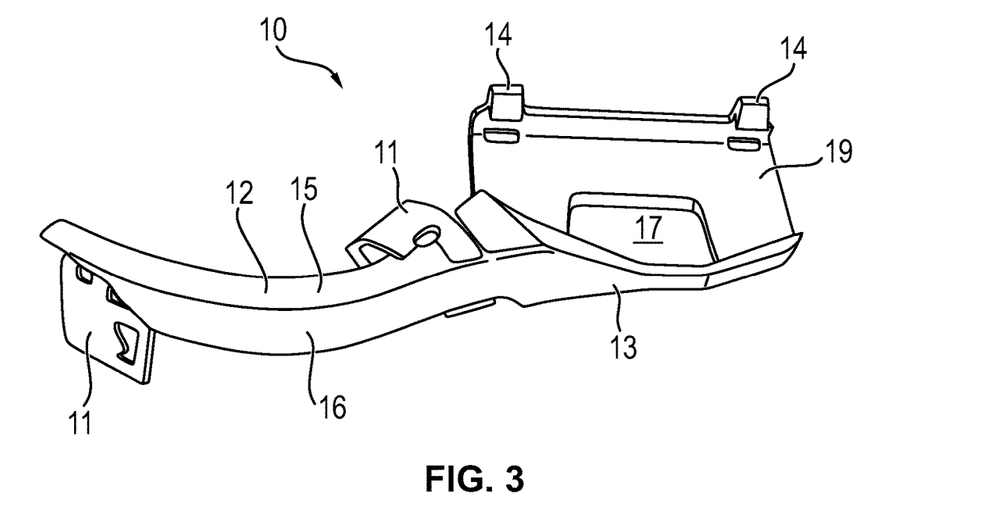
FIGS. 3 and 4 show a perspective view of the cable duct of the cable conduit device according to FIG. 1.
Figure 4:
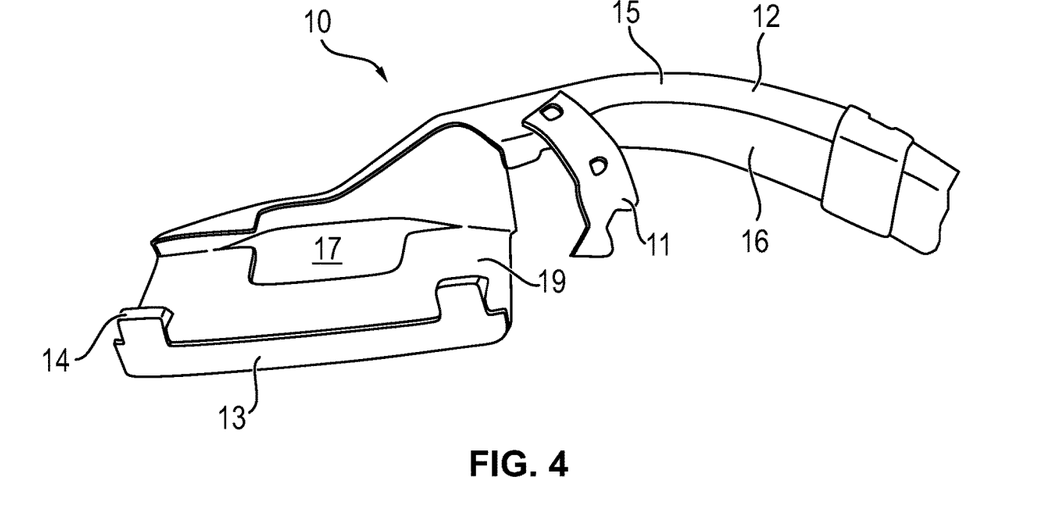

FIGS. 1 and 2 illustrate a cable conduit device for connection cables of an airbag module comprising a cable duct 10 and a contact plug 20. FIGS. 3 and 4 illustrate the cable duct 10 without the contact plug 20.

The cable duct 10 comprises a conduit portion 12 and a connecting portion 13. The conduit portion 12 serves for guiding cables 30 along a predetermined guide path. For this purpose, the conduit portion 12 encloses the cables 30 at least in part. Especially, the conduit portion 12 has a U-shaped cross-sectional profile in which the cables 30 are arranged. The conduit portion 12 concretely comprises a duct bottom 15 and two sidewalls 16 which are disposed substantially normal to the duct bottom 15 and in parallel to each other. Furthermore, in the conduit portion 12 retaining means 11 of the cable duct 10 are provided for preventing the cables 30 from slipping out of the conduit portion 12. In the embodiment according to FIGS. 1 to 4, the retaining means 11 are in the form of tabs being articulated to the cable duct 10, especially to the duct bottom 15, and extending in a closed state over the conduit portion 12, especially over the sidewalls 16.

A connecting portion 13 is integrally connected to the conduit portion 12. The connecting portion 13 comprises a bottom plate 19 orientated substantially in parallel to the duct bottom 15. The bottom plate 19 supports snap hooks 14 that are formed integrally with the bottom plate 19. The snap hooks 14 are arranged at the edges of the bottom plate 19 and extend especially normal to the bottom plate 19. The bottom plate 19 is dimensioned so that it forms a seat for the contact plug 20. Especially, the width of the bottom plate 19 is larger than the width of the contact plug 20 so that the snap hooks 14 can laterally encompass the contact plug 20. The snap hooks 14 engage in corresponding recesses on the contact plug 20 so as to fix the contact plug 20 in a twist-proof manner to the cable duct 10. Concretely speaking, the connecting portion 13 of the cable duct 10 is provided to have a contour which substantially corresponds to the outer contour of the contact plug 20.

It is evident from FIGS. 2 and 3 that in the bottom plate 19 a recess 17 is arranged. Through the recess 17 there may extend portions or additional parts of the contact plug 20 which protrude from a rear wall and, resp., a plug cover 22 of the contact plug 20. The recess 17 also enables access to components disposed within the contact plug 20, such as a battery, an electric fuse or a relay.

Figure 6:
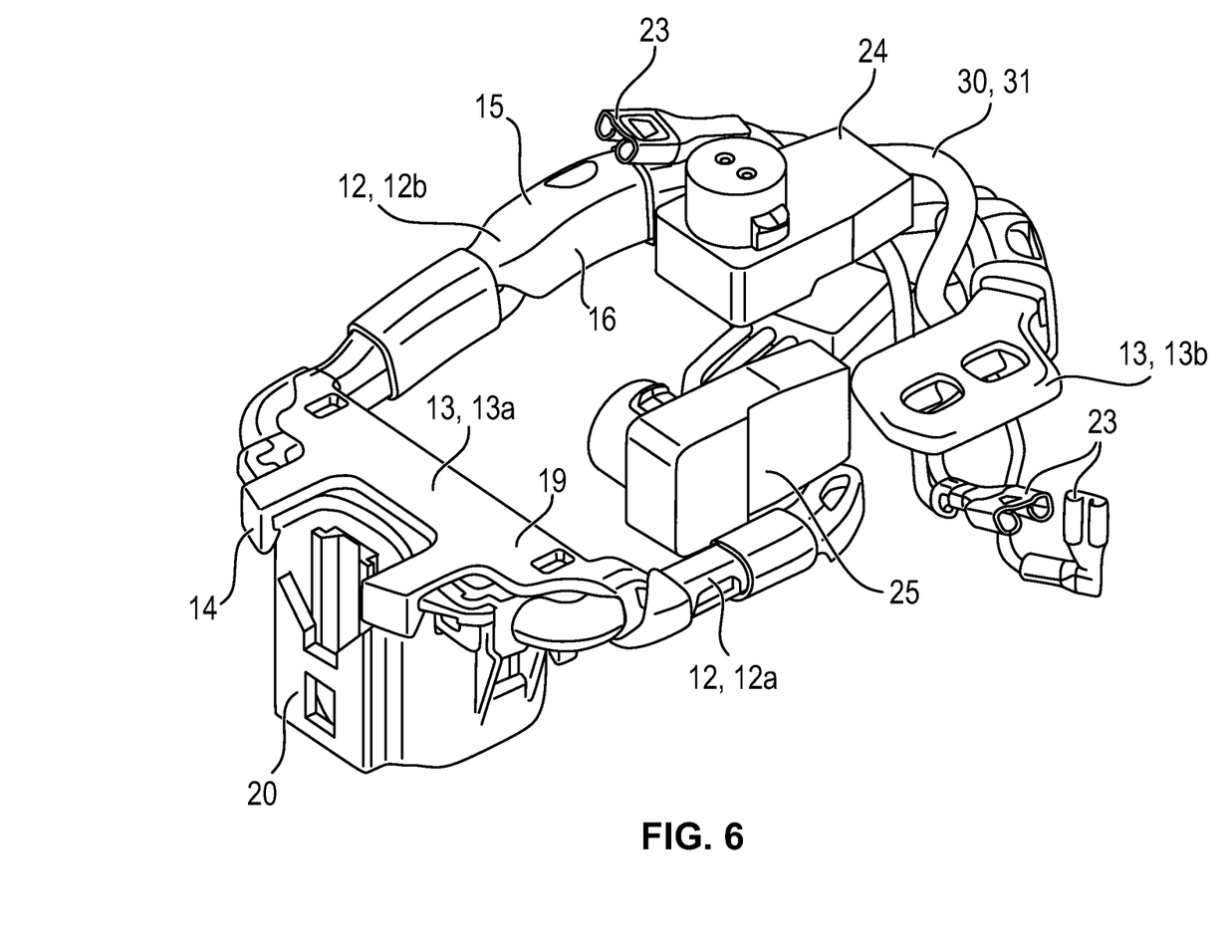
FIG. 6 shows a perspective view of the cable conduit device according to FIG. 5.
Figure 7:
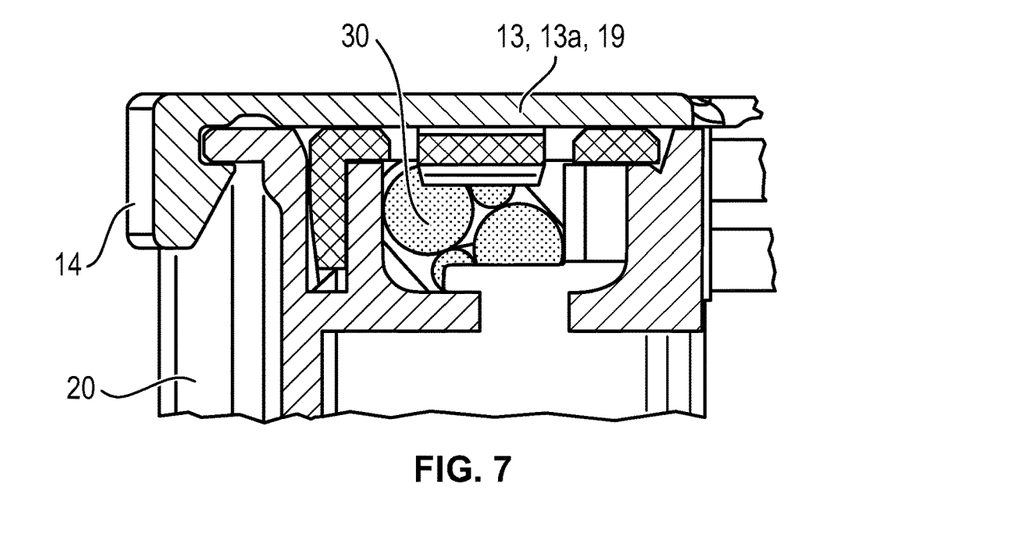
FIG. 7 shows a sectional view across the cable conduit device according to FIG. 8 in the area of the contact plug.

In the embodiment according to FIGS. 1 to 4, the cable duct 10 includes one single connecting portion 13 that is connected to a longitudinal end of the single conduit portion 12. In other words, the connecting portion 13 is arranged on a longitudinal end of the cable duct 10. Different configurations of the cable duct 10 are possible. For example, the connecting portion 13 may be arranged in the center of the cable duct 10, especially between two conduit portions 12. Such embodiment is illustrated in FIGS. 5 to 7.

Figure 5:
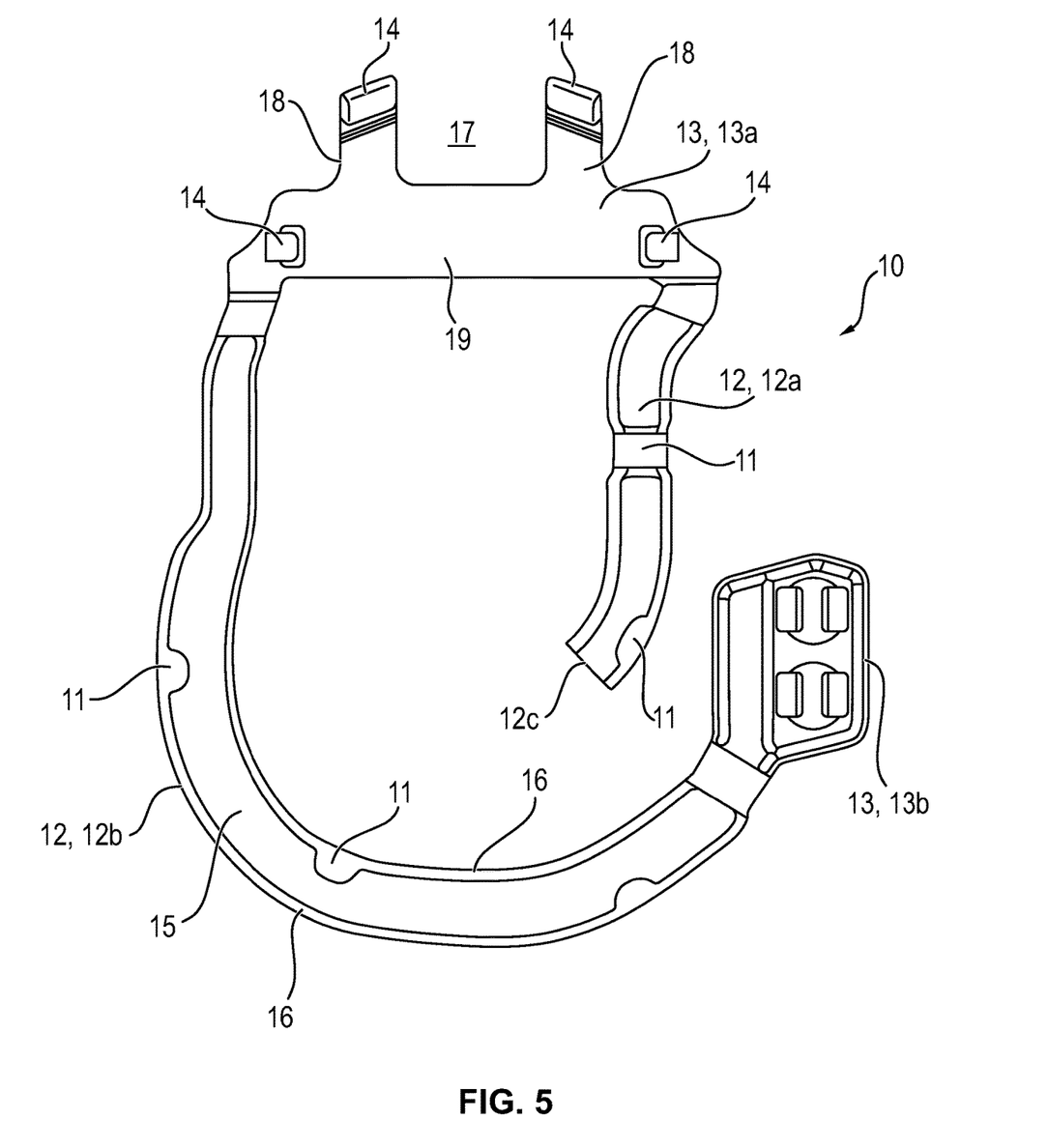
FIG. 5 shows a top view onto a cable duct of a cable conduit device according to the invention in accordance with a further preferred embodiment, the connecting portion including snap hooks for encompassing a contact plug.

FIG. 5 illustrates a cable duct 10 including two conduit portions 12. A first connecting portion 13a is disposed between the conduit portions 12. There is provided a first conduit portion 12a which, on the one hand, is integrally connected to the first connecting portion 13a und, on the other hand, has a free end 12c. A second conduit portion 12b extends between the first connecting portion 13a and a second connecting portion 13b. The second connecting portion 13b is disposed at a longitudinal end of the cable duct 10, whereas the first connecting portion 13a is positioned between the first conduit portion 12a and the second conduit portion 12b. Each of the conduit portions 12a, 12b includes retaining means 11 in the form of projections of the sidewalls 16. The projections of the sidewalls 16 substantially extend in parallel to the duct bottom 15 and thus form a form-fit holding fixture for cables 30. In so far, also in the embodiment according to FIGS. 5 to 7 the conduit portions 12 are provided to have respective U-shaped cross-sectional profiles.

The first connecting portion 13a serves for accommodating the contact plug 20. The first connecting portion 13a includes a bottom plate 19 supporting snap hooks 14. In contrast to the embodiment according to FIGS. 1 to 4, the bottom plate 19 includes an outwardly open recess 17 that is delimited by two plate extensions 18. The plate extensions 18 end in snap hooks 14 which are orientated substantially normal to the bottom plate 19. The plate extensions 18 extend in the plane of the bottom plate 19. In total, there are provided four snap hooks 14 being orientated and arranged spaced apart from each other so that they the encompass sidewalls of the contact plug 20 and fix the contact plug by form fit to the first connecting portion 13a, especially to the cable duct 10.

The second connecting portion 13b is disposed on a longitudinal end of the cable duct 10, especially on a longitudinal end of the second conduit portion 12b and serves for accommodating a further plug which can especially be used to connect cables to the steering wheel.

FIG. 6 illustrates the cable conduit device including the cable duct 10 from FIG. 5. In the first connecting portion 13a the contact plug 20 that is used for coupling the cable conduit device to a coil spring on a steering column is arranged. Plural cables 30 extend in the conduit portions 12, wherein module connection cables 31 are provided for establishing an electrical connection between the contact plug 20 and an airbag module. The module connection cables 31 especially extend to plug connectors which can be connected to the airbag module. FIG. 6 especially illustrates a gas generator plug 24, a TAU plug 25 as well as horn contact plugs 23. The gas generator plug 24 serves for electrical contacting of a gas generator which contains a pyrotechnical charge for deployment of an airbag. The TAU plug 25 allows for electrical contacting of a Tether Activation Unit (TAU) that is used, for example, for severing a tether for the airbag. The horn contact plugs 23 are connectable to horn contacts provided on the airbag module. Further, at least one horn contact plug 23 that is connectable to a horn contact on the steering wheel may be provided.

In general, in the conduit portions 12 of the cable duct 10 also steering wheel connection cables 32 may be disposed. In the embodiment shown here, the steering wheel connection cables 32 extend especially through the first conduit portion 12a and end up in a multi-function plug 26. The multi-function plug forms an electrical connecting option for multi-function keys on the steering wheel.

From the cross-sectional view according to FIG. 7 it is clearly evident in which way the snap hooks 14 laterally encompass the contact plug 20 at the first connecting portion 13a and thus fix the same on the bottom plate 19. It is further clearly visible that the snap hooks 14 are arranged at the edge of the bottom plate 19. The snap hooks 14 are especially integrally formed with the bottom plate 19.

Figure 8:
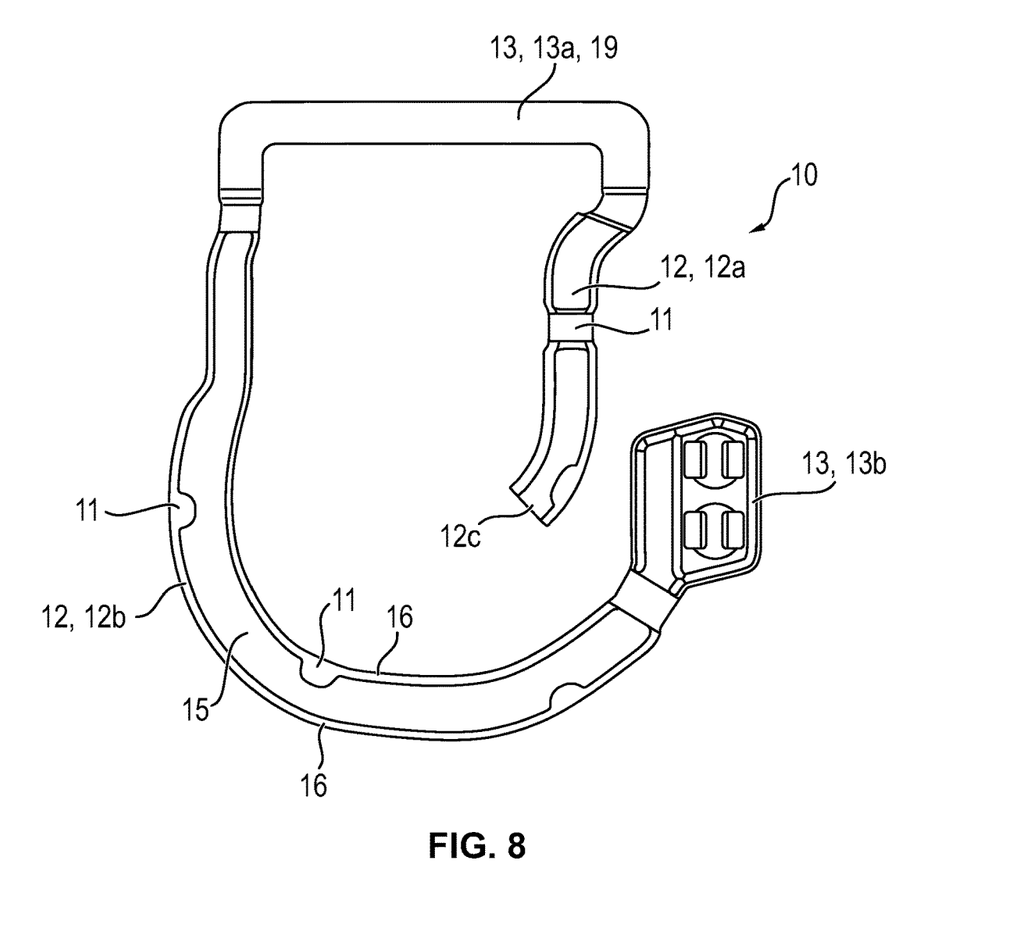
FIG. 8 shows a top view onto a cable duct of a cable conduit device according to the invention in accordance with a further preferred embodiment, wherein the connecting portion is configured for being positioned between a plug body and a plug cover of the contact plug.
Figure 9:
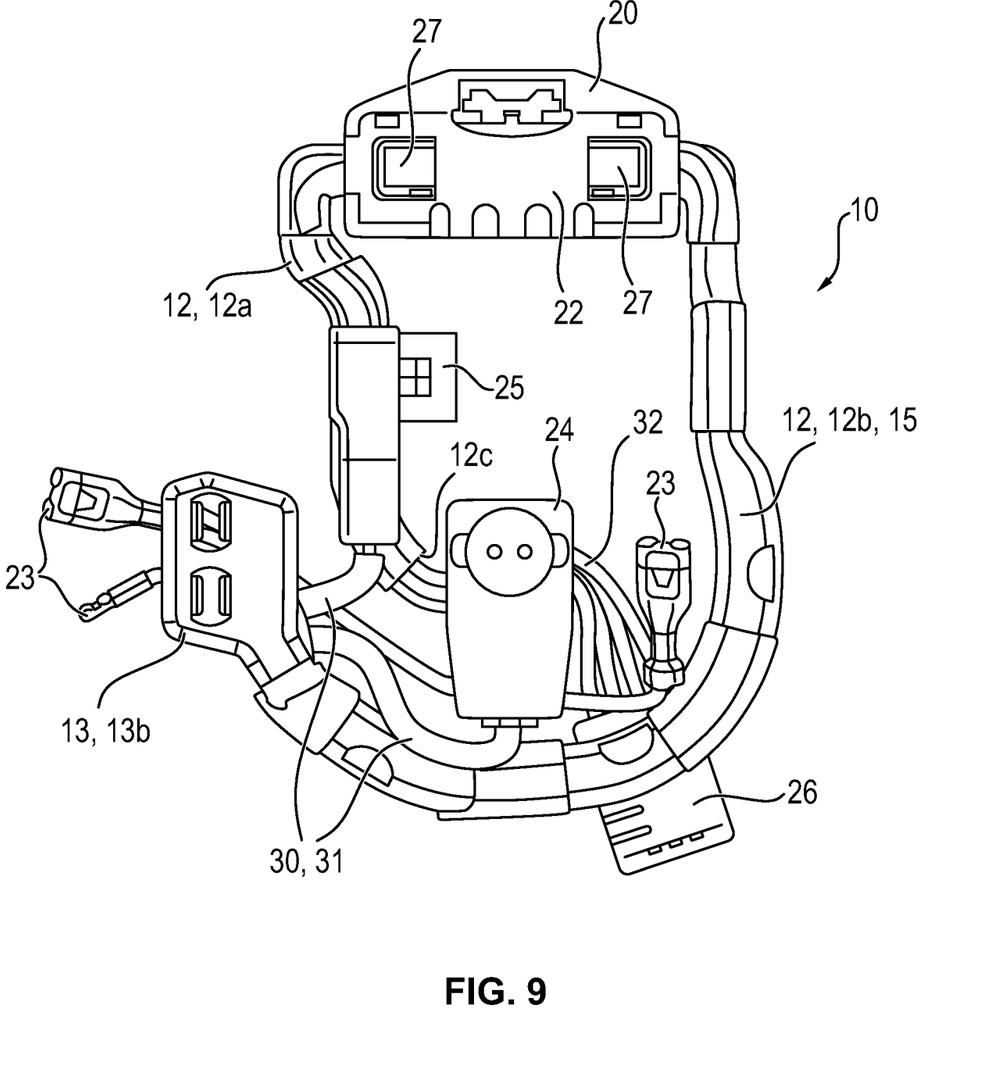
FIG. 9 shows a top view onto the cable conduit device including the cable duct according to FIG. 8.
Figure 10:
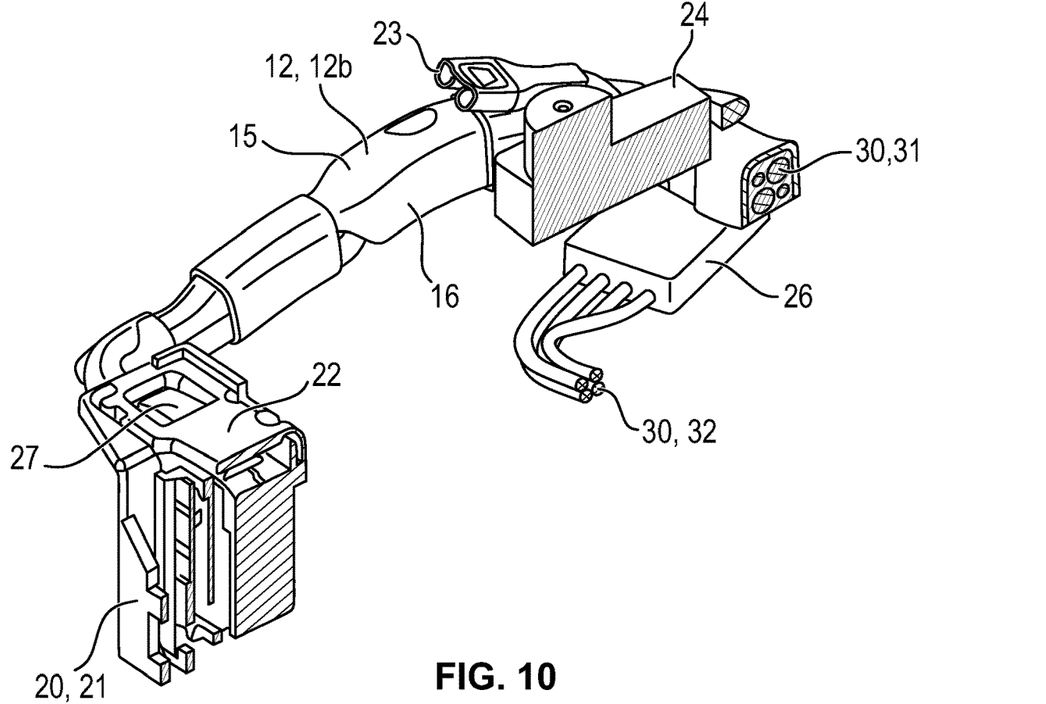
FIG. 10 shows a perspective sectional representation across the cable conduit device according to FIG. 9.
Figure 11:
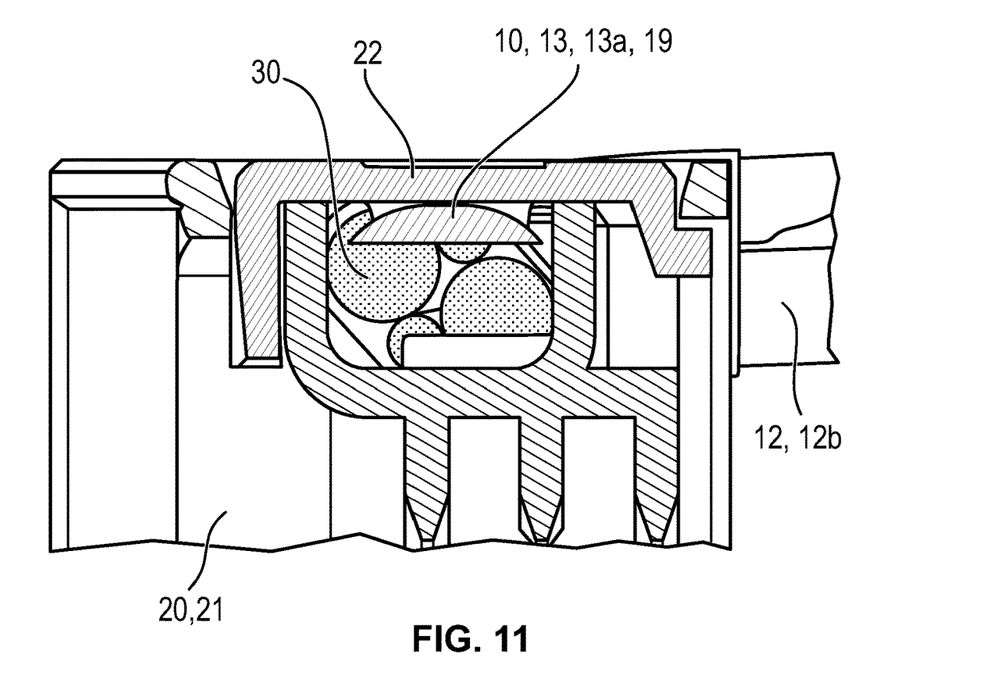
FIG. 11 shows a sectional view across the cable conduit device according to FIG. 10 in the area of the contact plug.

In FIGS. 8 to 11 another variant of a cable conduit device is illustrated, with FIG. 8 showing the cable duct 10 of the cable conduit device in a top view. The cable conduit device and, resp., the cable duct 10 is substantially configured similarly to the embodiment according to FIGS. 5 to 7. In particular, the cable duct 10 includes two conduit portions 12a, 12b being interconnected by a first connecting portion 13a. At a longitudinal end of the second conduit portion 12b a second connecting portion 13b adapted to support another plug for connection to the steering wheal is arranged. The shape of the conduit portions 12a, 12b is configured equally analogously to the second embodiment according to FIGS. 5 to 7. In particular, the second conduit portion 12b is substantially hook-shaped or J-shaped so as to guide the cables 30 around a gas generator of the airbag module. The first conduit portion 12a is substantially curved in S-shape.

The embodiment according to FIGS. 8 to 11 differs from the embodiment according to FIGS. 5 to 7 substantially by the shape of the first connecting portion 13a. In the embodiment according to FIGS. 8 to 11, the first connecting portion 13a is constituted by a bottom plate 19 having a width that is smaller than the width of the contact plug 20. The bottom plate 19 and, resp., the connecting portion 13a is substantially beam-shaped and exhibits a straight extension.

The contact plug 20 is coupled to the cable duct 10 by a splitting of the contact plug 20. In particular, the contact plug 20 is formed by a plug body 21 that is closed by a plug cover 22. The plug cover 22 thus forms a rear wall of the contact plug 20. Between the plug body 21 and the plug cover 22 a clearance is provided through which the first connecting portion 13a of the cable duct 10 extends. The first connecting portion 13a of the cable duct 10 in this way is positively enclosed by the contact plug 20. This is clearly evident from FIG. 11. The plug cover 22 preferably includes clamp spring elements 27 for applying a clamping force to the cable duct 10 and, resp., to the first connecting portion 13a. In this way, the cable duct 10 may be coupled by clamping to the contact plug 20.

The embodiments according to FIGS. 5 to 11 comprising the second connecting portion 13b that is adapted to accommodate another plug offer the advantage that for connecting the steering wheel and, resp., the electric steering wheel functions to the coil spring on a steering column merely the contact plug 20 has to be connected to the coil spring. All of the further connections can be made in advance already by the cable conduit device. In this way, the assembly of the steering wheel in a vehicle is considerably facilitated.

LIST OF REFERENCE NUMERALS 10 cable duct
11 retaining means
12 conduit portion
12a first conduit portion
12b second conduit portion
12c free end
13 connecting portion
13a first connecting portion
13b second connecting portion
14 snap hook
15 duct bottom
16 sidewall
17 recess
18 plate extension
19 bottom plate
20 contact plug
21 plug body
22 plug cover
23 horn contact plug
24 gas generator plug
25 TAU plug
26 multi-function plug
27 clamp spring element
30 cable
31 module connection cable
32 steering wheel connection cable

The invention claimed is:

1. A cable conduit device for connection cables of an airbag module, comprising:
   at least one cable duct (10) that includes retaining means (11) for at least one cable (30); and
   at least one contact plug (20) is coupled in a rotationally fixed manner to the at least one cable duct (10);
   wherein the at least one cable duct (10) extends through the at least one contact plug (20).

2. The cable conduit device according to claim 1, wherein the cable duct (10) includes a conduit portion (12) and a connecting portion (13), and wherein the contact plug (20) is configured to be coupled to the connecting portion (13).

3. The cable conduit device according to claim 2, wherein the connecting portion (13) includes snap hooks (14) or clip connectors for connection to the contact plug (20), wherein the connecting portion (13) has a bottom plate (19) on which the snap hooks (14) or clip connectors are disposed so that the snap hooks (14) or clip connectors laterally encompass the contact plug (20) in a coupled state.

4. The cable conduit device according to claim 2, wherein the connecting portion (13) extends through the contact plug (20), the contact plug (20) comprising a plug cover (22) and a plug body (21), and wherein the connecting portion (13) is configured to be arranged between the plug cover (22) and the plug body (21).

5. The cable conduit device according to claim 2, wherein the connecting portion (13) includes a bottom plate (19) having a width that is smaller than the width of the contact plug (20), and/or wherein the contact plug (20) and/or the connecting portion (13) is arranged at a longitudinal end or between longitudinal ends of the cable duct (10).

6. A wiring system of the airbag module comprising the cable conduit device according to claim 1 and comprising one or more electrically conducting cables (30) that are arranged in the cable conduit device and are positively fixed by the retaining means (11).

7. The wiring system according to claim 6, wherein the cables (30) comprise module connection cables (31), comprising at least one of:
at least one release cable for at least one pyrotechnical actuator, and at least one horn contact cable (23), steering wheel connection cables (32), at least one multi-function switch cable (26), at least one lighting cable.

8. The airbag module comprising the cable conduit device of claim 1.

9. The airbag module according to claim 8, wherein the cable conduit device bundles all or a first part of the connection cables (30) of the airbag module.

10. A steering wheel comprising the cable conduit device according to claim 1.

11. The cable conduit device according to claim 1, wherein the cable conduit (10) and the contact plug (20) are adhesively coupled to one another.

12. The cable conduit device according to claim 1, wherein the cable duct (10) is formed integrally as a plastic injection molded part.

13. The airbag module comprising the wiring system of claim 6.

14. The wiring system according to claim 7, wherein the steering wheel connection cables (32) end in the contact plug (20).

15. The wiring system according to claim 14, wherein the steering wheel plug is connected to the contact plug (20) by a conduit portion (12) of the cable duct (10).

16. A steering wheel comprising a wiring system of claim 6.

17. A steering wheel comprising the air bag module of claim 8.

18. The cable conduit device according to claim 1, wherein the at least one contact plug (20) has a plug cover (22) and a plug body (21), and wherein the at least one cable duct (10) is disposed between the plug cover (22) and the plug body (21).

* * * * *